United States Patent
Nicolino

(10) Patent No.: US 6,889,707 B2
(45) Date of Patent: May 10, 2005

(54) PRESSURE ACTUATED SHUT-OFF VALVE WITH MEMBRANE

(75) Inventor: Aldo Nicolino, Caselette (IT)

(73) Assignee: Pres-Block, S.p.A., Via Alpignano (IT)

( * ) Notice: Subject to any disclaimer, the term of this patent is extended or adjusted under 35 U.S.C. 154(b) by 0 days.

(21) Appl. No.: 10/475,747

(22) PCT Filed: Apr. 29, 2002

(86) PCT No.: PCT/IT02/00275

§ 371 (c)(1), (2), (4) Date: May 3, 2004

(87) PCT Pub. No.: WO02/088580

PCT Pub. Date: Nov. 7, 2002

(65) Prior Publication Data

US 2004/0182447 A1 Sep. 23, 2004

(30) Foreign Application Priority Data

Apr. 27, 2001 (IT) .................................... TO2001A0404

(51) Int. Cl.$^7$ ............................................. F16K 15/14
(52) U.S. Cl. .............................. 137/513.5; 137/513.3; 137/515.5; 137/854
(58) Field of Search .......................... 137/513.3, 513.5, 137/515, 515.3, 515.5, 515.7, 854, 843

(56) References Cited

U.S. PATENT DOCUMENTS 3,779,276 A    12/1973    King, Sr.
4,054,152 A    10/1977    Ito et al.
4,177,831 A  * 12/1979    Benjamin ................ 137/513.5

FOREIGN PATENT DOCUMENTS

WO        WO 00/26567        5/2000

* cited by examiner

*Primary Examiner*—Ramesh Krishnamurthy
(74) *Attorney, Agent, or Firm*—Blank Rome LLP

(57) ABSTRACT

An ON/OFF valve (1,1',1") that has an outer body (3) defining a fluid flow cavity (2) divided by an intermediate surface (8, 21) into a first and a second chamber (2a, 2b) communicating with each other via an opening section (6, 28) in the intermediate surface (8, 21). A flexible shutter (7) has on the side facing the first chamber (2a), a membrane portion (17) that cooperates elastically, by virtue of a fluid pressure, with the intermediate surface (8, 21) and with the opening section (6, 28) to separate the first and second chamber (2a, 2b) hermetically. Fluid leakage generating members (20, 27) are located between the membrane portion (17) of the shutter (7) and the opening section (6, 28), and are active when the pressure in the first chamber (2a) exceeds the pressure in the second chamber (2b) by an amount equal to or less than a threshold value (P) other than zero.

8 Claims, 4 Drawing Sheets

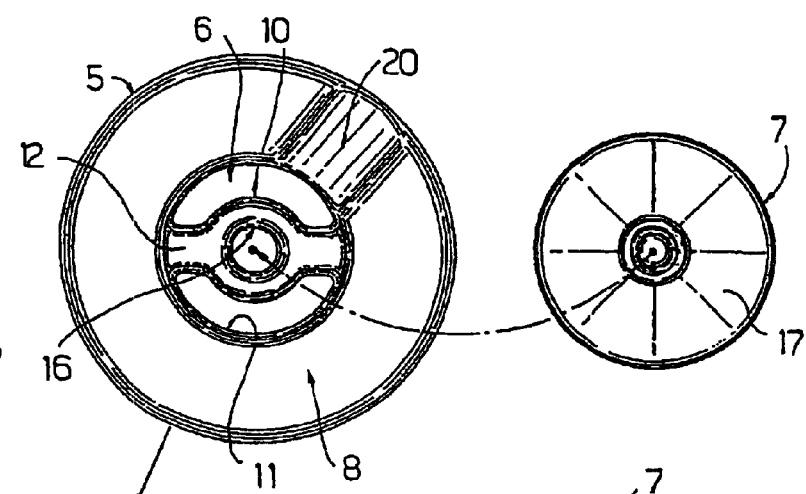
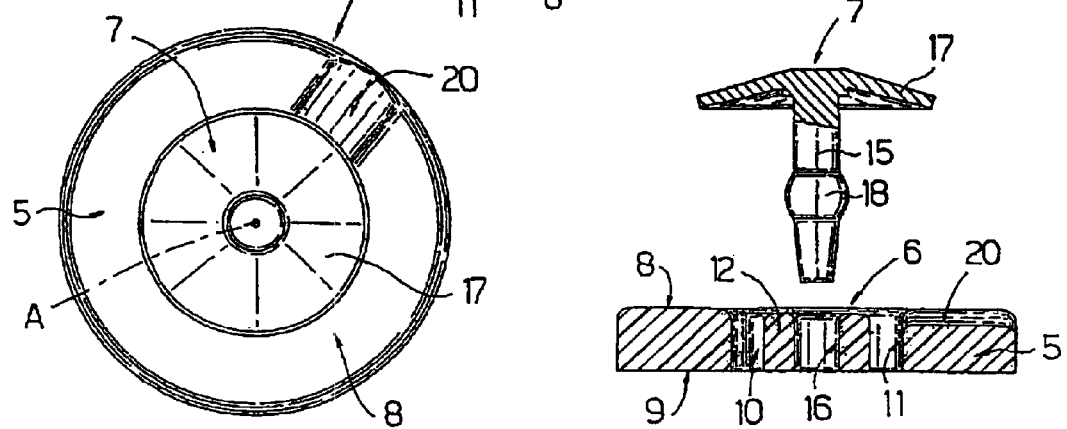
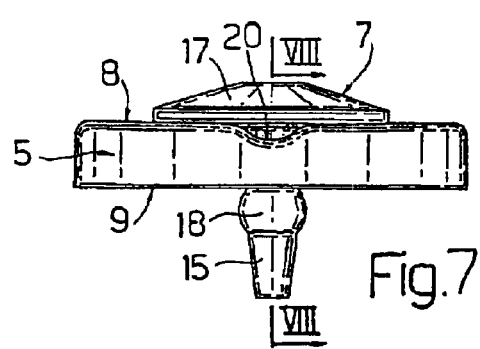
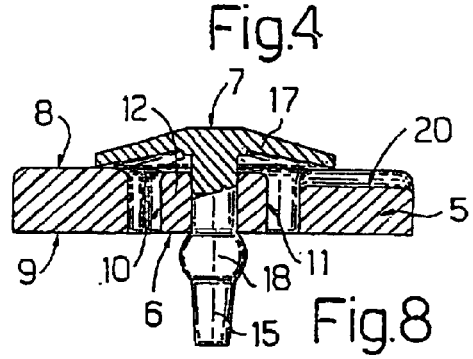
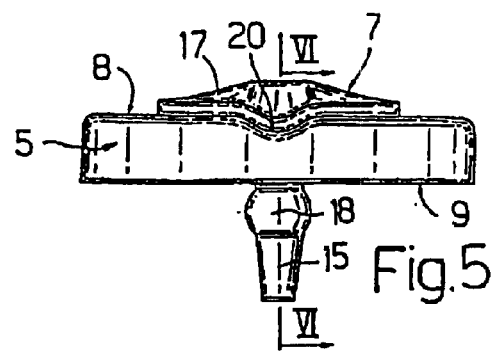
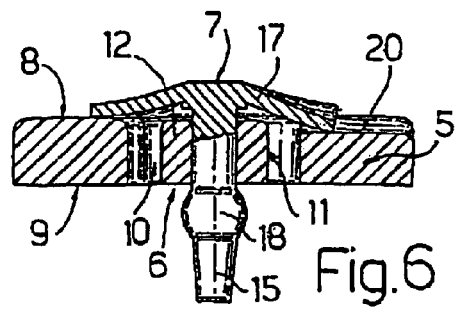

PRESSURE ACTUATED SHUT-OFF VALVE WITH MEMBRANE

TECHNICAL FIELD

The present invention relates to an ON/OFF valve, in particular for use in water circulation conduits of household coffee machines.

BACKGROUND ART

Valves of the above type are known which substantially comprise an outer casing defining a water flow cavity; a disk-shaped base member, which is inserted hermetically inside the cavity, and defines an intermediate opening section permitting water flow between a first and a second chamber of the cavity separated by the base member; and a flexible shutter having a stem fitted coaxially through the base member, and a membrane portion which projects radially from the end of the stem facing the first chamber, and cooperates elastically, by virtue of fluid pressure, with the opening section to separate the first and second chamber hermetically.

Valves of the above type are normally used to permit one-way water flow, and, in particular, are maintained in a closed configuration when the pressure in the first chamber is greater than that in the second chamber.

DISCLOSURE OF THE INVENTION

It is an object of the present invention to provide an ON/OFF valve which is structurally as straightforward as the type described above, but which permits two-way flow between the chambers connected by the valve, when the pressure difference between the chambers is below a predetermined threshold value other than zero.

According to the present invention, there is provided an ON/OFF valve as claimed in claim 1.

BRIEF DESCRIPTION OF THE DRAWINGS

Three preferred, non-limiting embodiments of the present invention will be described by way of example with reference to the accompanying drawings, in which:

FIG. 3 shows a plan view of the assembly sequence of the inner portion of the valve in FIGS. 1 and 2;

FIG. 4 shows an exploded axial section of the inner portion of the FIG. 1 valve;

FIG. 5 shows a side view of the inner portion of the FIG. 1 valve in a closed configuration;

FIG. 6 shows a section along line VI—VI in FIG. 5;

FIG. 7 shows a side view of the inner portion of the FIG. 1 valve in a leakage configuration;

FIG. 8 shows a section along line VIII—VIII in FIG. 7;

BEST MODE FOR CARRYING OUT THE INVENTION

Figure 1:
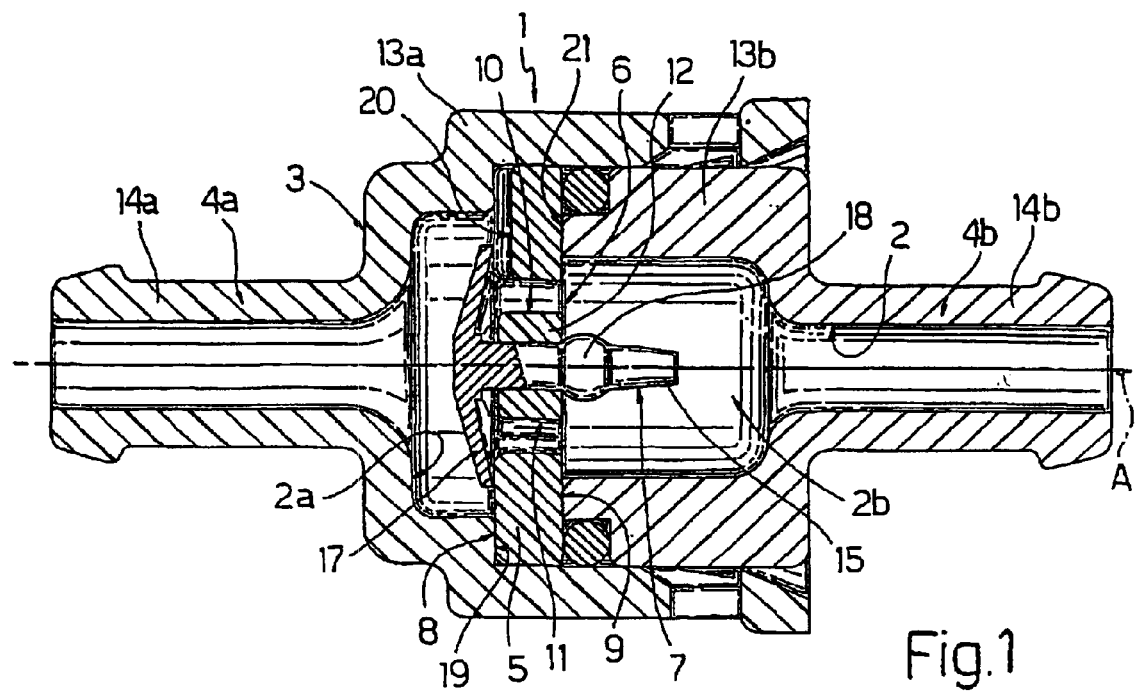
FIG. 1 shows an axial section of an ON/OFF valve in accordance with the present invention.
Figure 2:
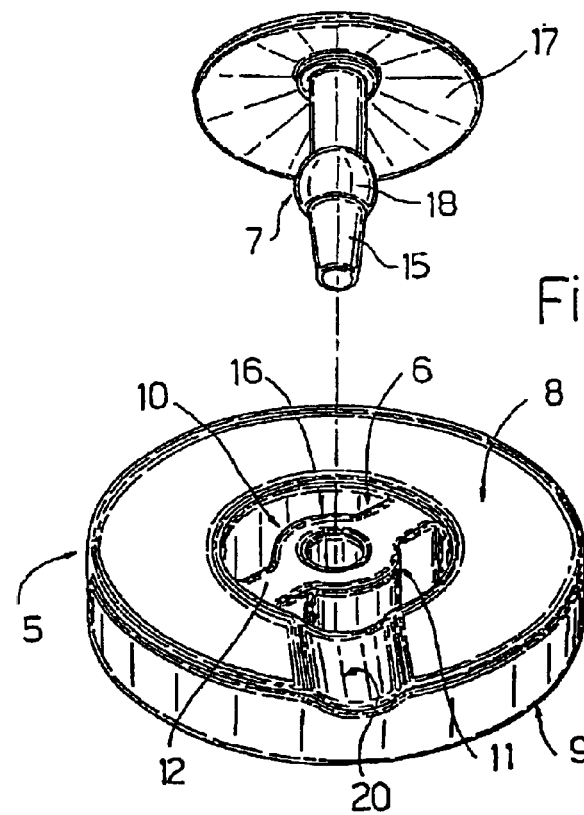
FIG. 2 shows an exploded view in perspective of an inner portion of the FIG. 1 valve.

With reference to FIGS. 1 to 8, number 1 indicates as a whole an ON/OFF valve in accordance with the present invention, and particularly suitable for use in the water circulation conduits of a household coffee machine.

Valve 1 has an axis A, and substantially comprises an outer casing 3 defining a cavity 2 for the passage of fluid—in the example shown, water; a disk-shaped base member 5 housed hermetically inside cavity 2 to divide the cavity into two separate chambers 2a, 2b, and having an opening section 6 permitting fluid flow through cavity 2; and a flexible shutter 7 carried by member 5 and cooperating elastically, by virtue of fluid pressure, with opening section 6 to separate chambers 2a and 2b hermetically.

More specifically, casing 3 is defined by two fittings 4a, 4b, which click together hermetically and are connected to respective water circulation conduits (not shown).

More specifically, fittings 4a, 4b have respective cylindrical, cup-shaped main portions 13a, 13b connected to each other, and from which project respective cylindrical, tubular endpieces 14a, 14b, which are smaller in section than main portions 13a, 13b, and are connected to the water circulation conduits.

One (4b) of fittings 4a, 4b is mounted with its main portion (13b) inside the main portion (13a) of the other fitting (4a).

Base member 5 is locked axially between an annular shoulder 19 of main portion 13a of fitting 4a and an annular end surface 21 of main portion 13b of fitting 4b, so that chambers 2a and 2b are defined by fittings 4a and 4b respectively. Base member 5 is defined towards chambers 2a, 2b by respective end surfaces 8, 9.

Opening section 6 is formed in an intermediate position through base member 5, and is defined by two substantially half-moon-shaped through openings 10, 11 defining, on opposite sides, a seating portion 12 for shutter 7.

As shown, particularly in FIG. 3, openings 10, 11 and seating portion 12 lie within a circular area of axis A, the edge of which is defined on diametrically opposite sides by the peripheral edges of openings 10, 11.

Shutter 7—which is preferably made of organic polymer, e.g. silicone-base, material compatible with use in contact with food products—comprises a stem 15 fitted through a hole 16 of axis A in seating portion 12 of base member 5; and a circular membrane portion 17 projecting radially from one end of stem 15, and which cooperates elastically with end surface 8 of base member 5 about opening section 6.

In the example shown, stem 15 of shutter 7 extends through hole 16 in base member 5 and projects inside chamber 2b, while membrane portion 17 is housed inside chamber 2a.

On the opposite side to membrane portion 17, stem 15 has a spherical projection 18, which, infuse, projects inside chamber 2b, and rests against end surface 9 of base member 5 and about the edge of hole 16 to prevent axial withdrawal of shutter 7.

Membrane portion 17 of shutter 7 is dome-shaped and convex on the side facing chamber 2a.

An important aspect of the present invention is that base member 5 comprises, along end surface 8, a lateral groove 20 communicating with opening section 6 to allow fluid to leak through base member 5 when the pressure in chamber 2a exceeds the pressure in chamber 2b by an amount equal to or less than a threshold value P, depending on the geometry of groove 20.

More specifically, groove 20 has an open U-shaped cross section, and extends radially from opening section 6 to a peripheral edge of base member 5. More specifically, groove 20 extends from a radially-outer peripheral edge of opening 11, and projects radially with respect to membrane portion 17.

In actual use, when the pressure in chamber 2a exceeds the pressure in chamber 2b by an amount greater than threshold value P, membrane portion 17 adheres to end surface 8 of base member 5, and also to groove 20, thus separating chambers 2a and 2b hermetically (FIGS. 5 and 6).

Conversely, when the difference between the pressure in chamber 2a and the pressure in chamber 2b is equal to or less than threshold value P, membrane portion 17 is detached from groove 20 in end surface 8 to allow fluid to leak between chambers 2a and 2b (FIGS. 7 and 8). This may be employed to prevent fluid from stagnating in chamber 2a when the pressure in chamber 2a falls, e.g. as when a delivery pump connected to cavity 2 is turned off; in which case, chambers 2a and 2b no longer need separating. Valve 1 therefore provides for better meeting the functional requirements of hydraulic systems.

Obviously, the maximum difference in pressure between chambers 2a and 2b governing two-way flow through cavity 2 is adjustable by adjusting the depth and geometry of groove 20.

Figure 9:
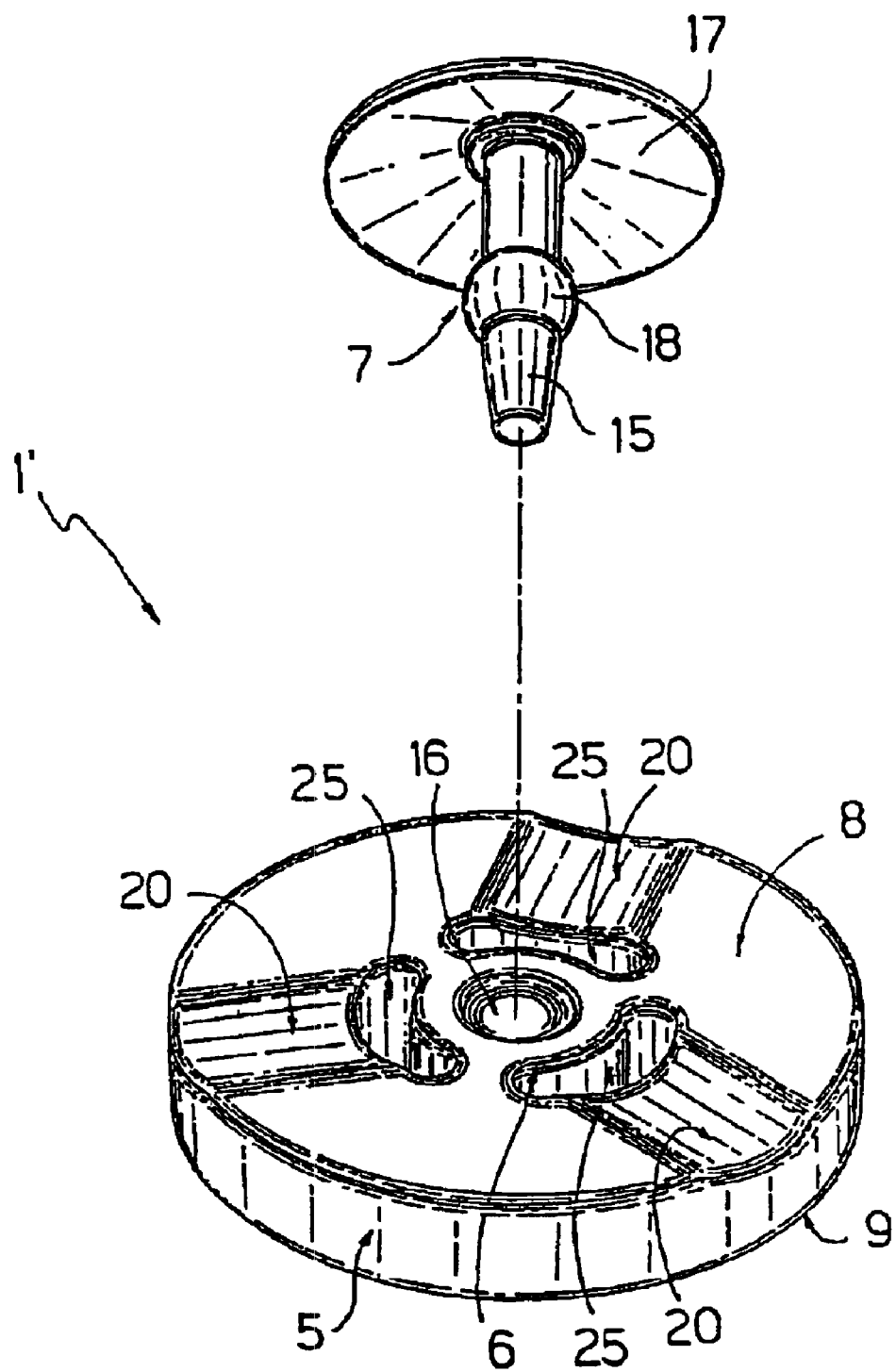
FIG. 9 shows an exploded view in perspective of a further embodiment of the inner portion of an ON/OFF valve in accordance with the present invention.
Figure 11:
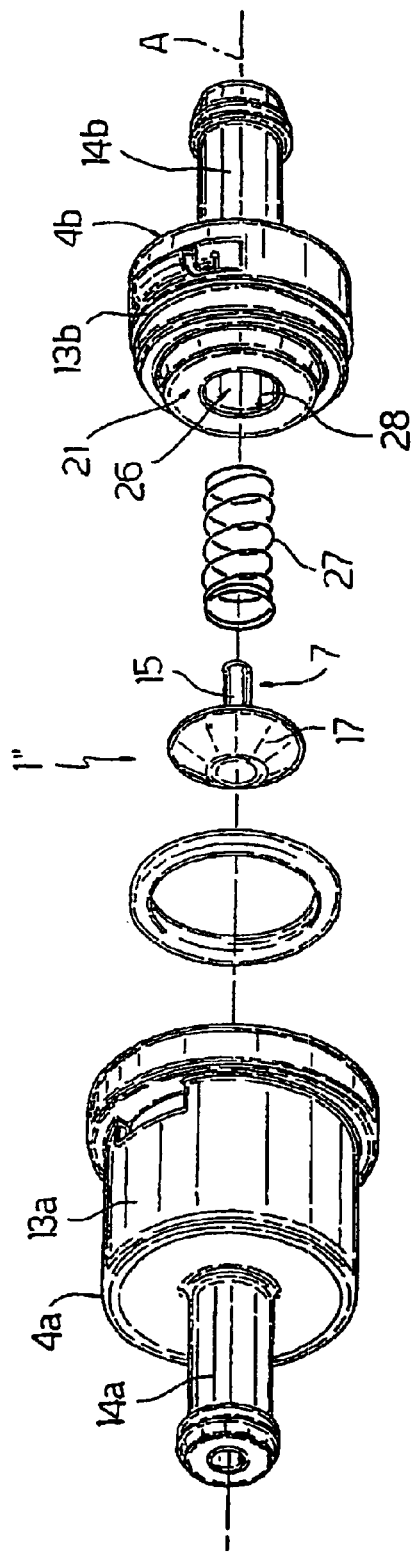
FIG. 11 shows an exploded view in perspective of the FIG. 10 valve.
Figure 10:
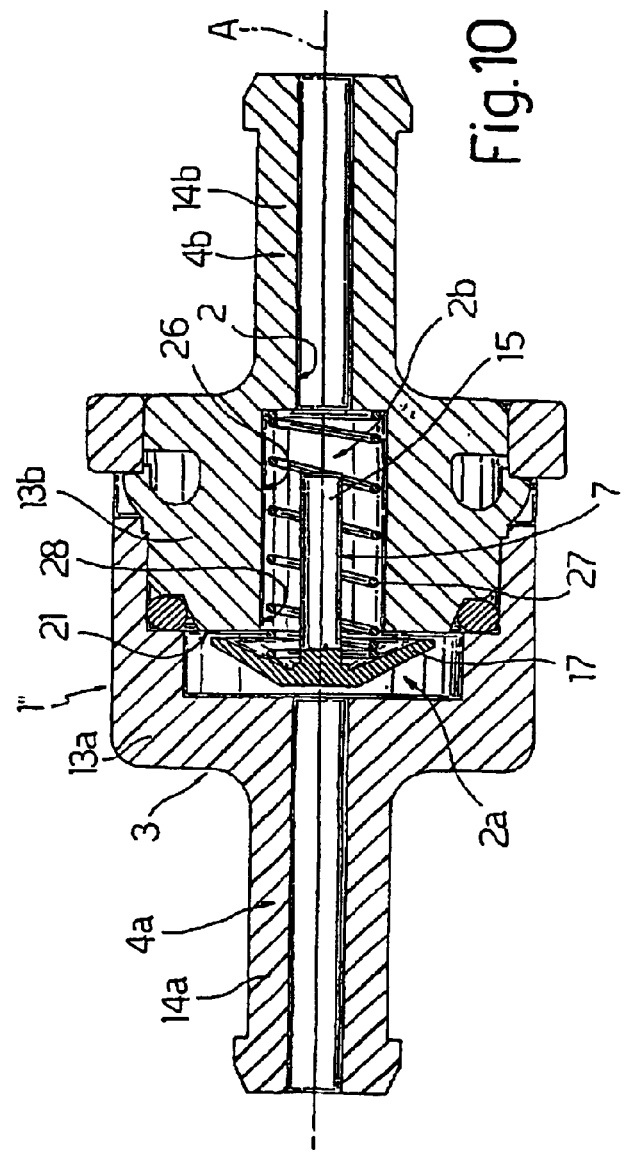
FIG. 10 shows an axial section of a further embodiment of an ON/OFF valve in accordance with the present invention.

Number 1' in FIG. 9 and number 1" in FIGS. 10 and 11 indicate as a whole two further embodiments of ON/OFF valves in accordance with the teachings of the present invention, and any parts of which identical with or equivalent to those of valve 1 already described are indicated, where possible, using the same reference numbers.

Valve 1' (FIG. 9) differs from valve 1 by comprising a number of—preferably three—grooves 20 equally spaced angularly about axis A, and by opening section 6 of base member 5 being defined by three through openings 25 equally spaced angularly about hole 16 and communicating with grooves 20.

Threshold value P therefore depends not only on the geometry but also on the number of grooves 20.

Valve 1" (FIGS. 10 and 11) differs from valve 1 by having no disk-shaped member 5, and by chamber 2b of fitting 4b defining a seat 26 housing a cylindrical coil spring 27, which acts on shutter 7 to keep it in an open configuration permitting fluid flow through cavity 2 when the pressure in chamber 2a exceeds the pressure in chamber 2b by an amount equal to or less than a threshold value P depending on the load of spring 27.

More specifically, stem 15 of shutter 7 loosely engages spring 27 and seat 26 in fitting 4b, while membrane portion 17, projecting inside chamber 2a, is positioned contacting one end of spring 27, and cooperates elastically with end surface 21 of main portion 13b of fitting 4b. In this case, chambers 2a and 2b communicate via a central opening 28 formed in end surface 21 and which is closed hermetically by membrane portion 17 of shutter 7 when, as already explained, the pressure in chamber 2a exceeds the pressure in chamber 2b by an amount greater than threshold value P.

In the open configuration of shutter 7, spring 27 keeps membrane portion 17 detached by a predetermined amount from end surface 21 of fitting 4b, so that chambers 2a and 2b communicate via opening 28.

Valve 1" operates in exactly the same way as valves 1 and 1'.

More specifically, when the pressure in chamber 2a exceeds the pressure in chamber 2b by an amount greater than threshold value P, membrane portion 17 compresses spring 27 and adheres to end surface 21 of fitting 4b to separate chambers 2a and 2b hermetically.

Clearly, changes may be made to valves 1, 1', 1" according to the present invention, without, however, departing from the scope of the accompanying claims.

What is claimed is:

1. An ON/OFF valve (1, 1', 1") comprising:
   an outer body (3) defining a fluid flow cavity (2) divided by an intermediate surface (8, 21) into a first and a second chamber (2a, 2b) communicating with each other via an opening section (6, 28) in the intermediate surface (8, 21); and
   a flexible shutter (7) having, on the side facing said first chamber (2a), a membrane portion (17) cooperating elastically, by virtue of a fluid pressure, with said intermediate surface (8, 21) and with said opening section (6, 28) to separate said first and said second chamber (2a, 2b) hermetically;
   characterized by comprising fluid leakage generating means (20, 27) located between said membrane portion (17) of said shutter (7) and said opening section (6, 28), and which are active when the pressure in said first chamber (2a) exceeds the pressure in said second chamber (2b) by an amount equal to or less than a threshold value (P) other than zero, said fluid leakage generating means including a number of grooves (20) formed in said intermediate surface (8) that are equally spaced about a central axis (A) of said intermediate surface (8) and extend radially with respect to said axis (A), said grooves (20) communicating with said opening section (6), and said threshold value (P) being a function of the geometry of said grooves (20).

2. A valve as claimed in claim 1, characterized in that said shutter (7) comprises a stem (15) extending inside said second chamber (2b); and in that said membrane portion (17) projects radially from one end of said stem (15).

3. A valve as claimed in claim 1, characterized in that said intermediate surface (8, 21) is annular, and centrally defines said opening section (6, 28).

4. A valve as claimed in claim 1, characterized in that said groove (20) extends from a radially-outer peripheral edge of said opening section (6), and projects radially with respect to said membrane portion (17).

5. A valve as claimed in claim 1, characterized in that said groove (20) has an open U-shaped cross section.

6. A valve as claimed in claim 1, characterized in that said opening section (6) comprises two substantially half-moon-shaped openings (10, 11) defining, on opposite sides, a seating portion (12) for said stem (15) of said shutter (7).

7. A valve as claimed in claim 1, characterized by comprising a disk-shaped base member (5) housed hermetically in said cavity (2), and which defines said intermediate surface (8) on the side facing said first chamber (2a); said stem (15) being fitted coaxially through said base member (5).

8. A valve as claimed in claim 1, characterized in that said membrane portion (17) of said shutter (7) is circular-dome-shaped and convex on the side facing said first chamber (2a).

* * * * *